United States Patent [19]

Downham

[11] Patent Number: 4,694,671
[45] Date of Patent: Sep. 22, 1987

[54] PRESS INCORPORATING SAFTEY SYSTEM
[75] Inventor: David Downham, Flitwick, England
[73] Assignee: Leslie Hartridge Limited, Buckingham, England
[21] Appl. No.: 922,839
[22] Filed: Oct. 17, 1986

Related U.S. Application Data
[63] Continuation of Ser. No. 728,949, Apr. 30, 1985, abandoned.

[30] Foreign Application Priority Data
May 3, 1984 [GB] United Kingdom ............... 8411336

[51] Int. Cl.$^4$ ............................................. B23Q 11/00
[52] U.S. Cl. ........................................ 72/26; 29/708; 192/129 A; 192/130; 192/137
[58] Field of Search ................... 72/21, 26, 465, 470, 72/389, 441, 444; 29/708; 192/129 R, 129 A, 130, 132, 137, 138, 143

[56] References Cited
U.S. PATENT DOCUMENTS

| | | | |
|---|---|---|---|
| 1,684,296 | 9/1928 | Brodsky | 192/134 |
| 2,400,486 | 5/1946 | Carlyle | 192/134 |
| 2,491,317 | 12/1949 | Klocke | 72/441 |
| 4,280,610 | 7/1981 | Meacham | 192/132 |
| 4,391,358 | 7/1983 | Haeger | 192/130 |

FOREIGN PATENT DOCUMENTS 2800403 7/1979 Fed. Rep. of Germany ...... 192/130

Primary Examiner—Robert L. Spruill
Assistant Examiner—David B. Jones
Attorney, Agent, or Firm—Berman, Aisenberg & Platt

[57] ABSTRACT

A press comprising a frame with an anvil support and a punch carrier, the latter being mounted on the frame so as to be movable between two ends of travel towards and away from the anvil support. A piston and cylinder arrangement is arranged to act on the punch carrier to urge the latter in a direction towards the anvil support. That one of the two ends of travel of the punch carrier which iscloser to the anvil support is defined by a part or parts of the press itself. A limit switch is operable by means of the motion of the punch carrier, or a part connected thereto, in the said direction when the remaining available travel is a distance which is less than the thickness of an operator's finger, to enable the piston and cylinder arrangement to act on the punch carrier with a working force in the said direction up to the end of its travel. There is a detector switch preferably connected to or arranged in the punch carrier, to detect when there is a resistance to movement of the punch carrier towards the anvil support. The detector switch is connected to control operation of the piston and cylinder arrangement to stop further such movement of the punch carrier following detection of such a resistance in the event that the limit switch has not been operated.

10 Claims, 3 Drawing Figures

PRESS INCORPORATING SAFTEY SYSTEM

This is a continuation of application Ser. No. 728,949, filed Apr. 30, 1985, now abandoned.

The present invention relates to a press incorporating a safety system which prevents exertion of a full working force being exerted on an operator's hand or finger in the event that his hand or finger is accidently positioned between the punch and anvil of the press. This avoids the need for a guard around those parts of the press, and facilitates speedy operation of the press from one job to the next.

Such a press is described in prior U.S. Pat. No. 4,391,358. In this prior construction, there are no means for adjusting the relative starting positioning between the punch and the anvil, prior to a closing stroke of the press to bring those operating parts together. Therefore, to allow for different sizes of workpiece which may be inserted between those operating parts of the press, or to allow for different sizes of tool attached to one of the operating parts, this particular construction of press detects when an electrically conductive path is completed across the operating parts. If there is such a completed path, the machine assumes, provided it is switched to operate on electrically conductive workpieces, that the operating parts have closed on to the workpiece and that the time has come for a full working force to be applied. In the event that a closing between the operating parts is resisted by an electrically non-conductive member, such as an operator's finger, the closing of a microswitch which results effects a retraction of the moveable operating part to prevent injury to the operator's finger. The microswitch is only overruled in the event that an electrically conductive path is completed across the operating parts of the press.

It will thus be appreciated that the press itself must not provide an electrically conductive path between the operating parts. If it did, a full operating force would be exerted on whatever were to be placed between the operating parts, irrespective of its electrical conductivity.

One disadvantage of this machine is that, for electrically non-conductive workpieces, the machine has to be switched to a different operating mode in which it can no longer distinguish between a workpiece and an operator's hand. A further disadvantage is that, even in the mode for electrically conductive workpieces, the press might amputate an operator's finger, for example, if a metallic ring which he is wearing should get trapped between the operating parts of the press.

It is an aim of the present invention to overcome these disadvantages. Accordingly, the present invention may be directed to a press comprising a frame with an anvil support or other fixed part and a punch carrier or other moveable part, the latter being mounted on the frame so as to be moveable between two ends of travel towards and away from the fixed part, and drive means arranged to act on the moveable part to urge the latter in a direction towards the fixed part, in which that one of the two ends of travel of the moveable part which is closer to the fixed part is defined by a part or parts of the press itself and in which a limit switch is operable by means of the motion of the moveable part, or a part connected thereto, in the said direction when the remaining available travel is a distance which is less that the thickness of an operator's finger, to enable the drive means to act on the moveable part with a working force in the said direction up to the end of its travel, in which there is a detector switch, preferably connected to or arranged in the moveable part, to detect when there is a resistance to movement of the moveable part towards the fixed part, and in which the detector switch is connected to control operation of the drive means to stop further such movement of the moveable part following detection of such a resistance in the event that the limit switch has not been operated.

One form of detector switch is a contact switch arranged between two relatively moveable portions of the fixed part or the moveable part, preferably the latter, so that the contact switch is operated by relative movement of those two portions towards one another due to the presence of an obstructing object between the fixed part and the moveable part.

The detector switch may prevent the working force being applied by stopping movement of the moveable part towards the fixed part, more preferably by causing the moveable part to be retracted away from the fixed part. This latter operation may be called a fly-back action. With a hydraulic cylinder and piston arrangement again, stopping of such movement may be simply by cutting feed of hydraulic fluid to the cylinder, and the fly-back action may be caused by changing the side of the piston to which hydraulic fluid is fed.

Preferably, a portion of the moveable part closest to the fixed part is adjustable, in relation to the rest of the moveable part, without changing the position at which the limit switch is operated relative to the end of travel of the moveable part. This adjustability may be by means of a screwthread.

With a hydraulic piston and cylinder arrangement as the drive means, a low pressure switch and a low pressure relief valve may be connected to a hydraulic feed line for a working movement of the arrangement, via a valve which is closed for high-pressure operation. The low pressure switch may be connected so that, if it is operated, it will also prevent a working force being applied to the moveable part. With such a system, three parts would have to fail simultaneously for an undesirable application of the working force: the contact switch would have to fail open, and the low pressure switch and the low pressure relief valve would both have to fail. Thus the system has a triple safety.

An example of a press made in accordance with the present invention is illustrated in the accompanying drawings, in which.

Figure 1:
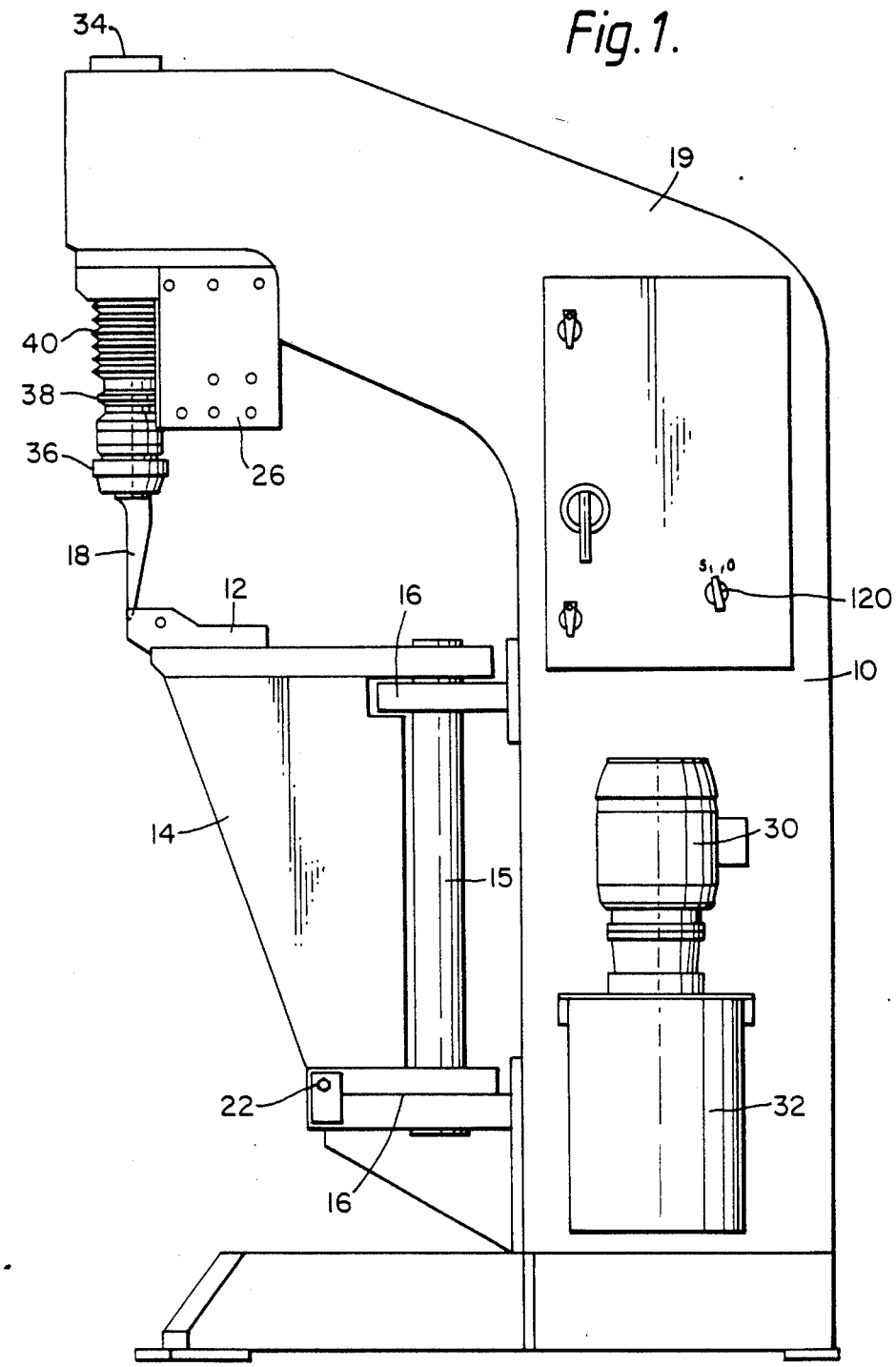
FIG. 1 shows a side elevational view of the machine.

The press shown in the drawings is a rivet bush or clinch nut inserting machine. It comprises a 'C' frame, hydraulically operated down-stroking press. It has a fabricated 'C' frame 10 of heavy duty construction which is capable of withstanding high forces generated during a working cycle, particularly with larger sizes of rivet bushes.

A lower anvil holder 12 is located on an upper forward surface or a rigid triangular swingable arm 14 pivoted about a massive vertical shaft 15 at upper and lower bearings 16. The arm may thereby be swung to a transverse position away from a punch holder 18 arranged on an upper arm 19 of the machine if the lower anvil holder 12 is not to be used. From there it may be swung back to its normal position shown in FIG. 1, in which the lower anvil 12 is brought directly underneath the punch holder 18. The arm 14 may be locked in this normal position by means of a swinging clamp 20. Adjustment to bring the anvil and punch in to precise alignment may be effected by an adjusting screw and locknut 22.

With the arm 14 in its normal position, the machine affords a deep throat for the majority of sheet metal work, in this particular instance the throat being 500 mm in depth.

The punch holder 18 in FIG. 1 is relatively long, increasing the machine's versatility by allowing penetration into deep sheet metal construction.

For smaller sheet metal work, and in particular for inserting rivet bushes or clinch nuts in box-or channel-section work, the arm 14 may be swung away to one side and an alternative detachable anvil holder (not shown) may be slid onto a further mount 26 on the upper arm 19 of the 'C'-frame 10. To allow this, a lower part of the mount 26 and an upper part of the detachable anvil holder have corresponding ribs and recesses.

To allow the overall length of the anvil holder to be reduced, a shorter punch holder may be used.

Figure 2:
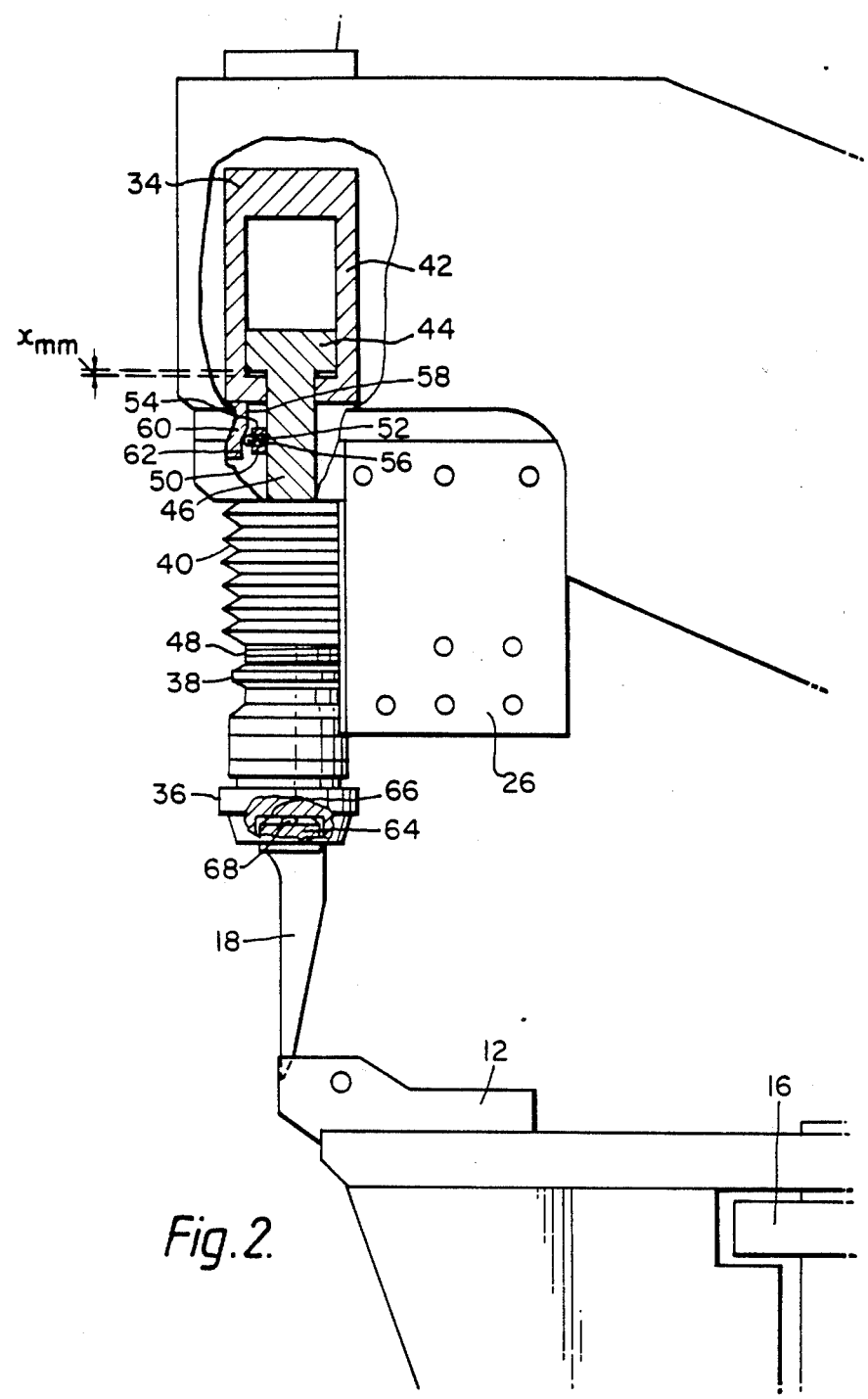
FIG. 2 shows on a larger scale, parts of the machine shown in FIG. 1 with portions cut away to reveal, diagrammatically, internal constructional features of the machine.
Figure 3:
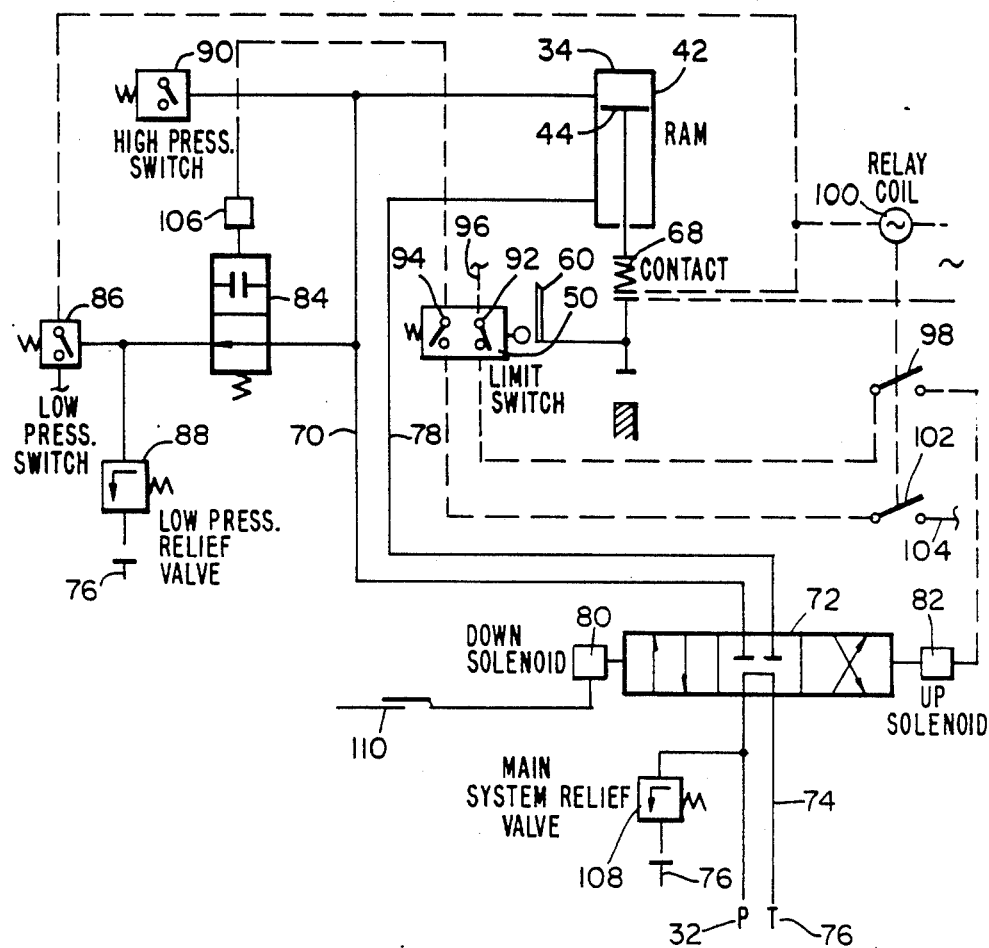
FIG. 3 shows electrical and hydraulic circuitry of the machine.

Whichever combination of anvil holder and punch holder is used, the same hydraulic system is used to effect the pressing operation of the machine. The system is shown in FIGS. 1 to 3, and comprises a driving pump motor 30 mounted on one side of the 'C'-frame 10 and coupled to drive a pump in a hydraulic pack 32. The latter is connected to drive a hydraulic piston and cylinder arrangement or ram 34 mounted on the upper end of the 'C'-frame 10. The locking device 36 for the punch holders is fixed to the lower end of the piston in this arrangement 34 via a fine calibrated adjustment 38. A bellows 40 surrounds the free end of the piston to protect the hydraulic cylinder from ingress of dirt or particles.

FIG. 2 shows certain parts of the press in greater detail. In particular, the piston and cylinder arrangement 34 is shown more clearly as comprising a cylinder 42 and a piston 44 which slides aixally within the cylinder 42. A piston rod 46 which is integral with the piston 44 extends downwardly into the interior of the bellows 40, and is rigidly fixed to an intermediate screwthreaded part 48 of the too holding part of the press. A down-limit switch 50 represented diagrammatically in FIG. 2 comprises a ball 52 slidable within a bore 54 and urged outwardly therefrom by a compression spring 56, but held therein by an upper surface 58 of an abutment or cam 60 until such time as a ball 56 is positioned opposite a recessed part 62 of the abutment or cam 60. This occurs when the piston is a distance x millimeters from its lower end of travel. X may be selected to have a value from 4 to 6, and is in any case a gap which is tool small for a finger to be inserted in. FIG. 2 also shows an upper portion 64 of the tool holder 18 which is slidable upwardly and downwardly, between upper and lower limits which are spaced apart by only 1 or 2 millimeters, within the locking device 36. Thus the punch holder 18 is effectively a floating head. The portion 64 is urged towards its lower position by resilient springs 66. Sandwiched between an underside of the locking device 36 and the top of the upper portion 64 is an electrically isolated contact switch 68.

The electrical and hydraulic circuitry of the press is shown in FIG. 3. Hydraulic fluid may be fed to the hydraulic piston and cylinder arrangement 34, on the upper side of the piston 44, by way of a feed line 70 and a four-port solenoid-operated valve 72, under the action of the pump 32. A drain line 74 leads away from this valve 72 back to a tank or reservoir 76. The interior of the cylinder 42 on the underneath side of the piston 44 is also connected to the four-port valve 72 via a feed line 78. A down-limit switch 50 (which may be adjustable) and a contact switch 68 are shown diagrammatically in FIG. 3. The four-port solenoid valve 72 has three possible positions. In its normal position as illustrated in FIG. 3, the ports to which the feed lines 70 and 78 are connected are closed-off, and the drain line 74 is connected directly to the pump 32. When the down solenoid 80 of the valve 72 is energised, the feed line 70 is connected to the pump 32, and the feed line 78 (in this position of the valve 72, acting as a drain line) is connected to the drain line 74. When an up solenoid 82 of the valve 72 is energised, the pump 32 is connected to deliver fluid to the feed line 78 leading to the underside of the piston 44, and the feed line 70 (now acting as a drain line) is connected to the drain line 74.

The hydraulic circuitry also comprises a high pressure dump valve 84 connected to the feed line 70. The valve 84 is a two-port solenoid valve having an open and closed setting, and being normally open under the action of a biassing spring and also under the action of oil flow through it when its solenoid is de-energised. The downstream port of this dump valve 84 is connected to a low pressure switch 86 which is triggered by a pressure equal to or exceeding about 10 p.s.i., and also a low pressure relief valve 88, connected to the tank 76, which starts to open at a pressure of about 20 p.s.i. A high-pressure switch 90 is also connected to the feed line 70, which is actuated by pressures exceeding 2500 p.s.i..

The down-limit switch 50 comprises a first pair of contacts 92 which are normally open but which are held closed by the abutment or cam 60 until the piston reaches the position illustrated in FIG. 2. The down-limit switch 50 also has another pair of contacts 94 which are normally open but which are closed when the piston 44 reaches the position illustrated in FIG. 2.

An electrical energising source 96 is connected via the contacts 92 of the down-limit switch 50 and the detector switch comprises a pair of contacts 98 closed by a relay coil 100 upon actuation of the contact switch 68, to the up solenoid 82 of the four-port valve 72. The relay coil 100 is also connected to be operated upon actuation of the low pressure switch 86. The detector switch further comprises another pair of contacts 102 also closed by the relay coil connect a further electrical energising source 104 to the solenoid 106 of the dump valve 84 via the contacts 94 of the down-limit switch 50. Finally, hydraulic fuel from the pump 32 may return to the tank 76 via a main system relief valve 108 opening at pressures in excess of 3000 p.s.i.

The press operates as follows.

With the motor 30 switched on and the pump 32 operating, hydraulic fluid is simply returned to the tank 36 via the drain line 74 when the valve 72 is in its normal setting shown in FIG. 3. Upon depression of a foot pedal 110 the down solenoid 80 of the valve 72 is energised, and the valve 72 is switched to the setting illustrated in the left hand side in the Figure, to feed hydraulic fluid to the cylinder 42 above the piston 44 via the feed line 70. The piston 44, along with the tool holder 18 descends rapidly as hydraulic fluid floods into the cylinder interior above the piston 44 and drains out through its underside via the line 78 and the drain line 74 to the tank 76. During descent of the ram, the pressure in the line 70 can be seen by the low pressure switch 86, and also the low pressure relief valve 88, because the dump valve 84 is in its open position. The pressure in the line 70 can in any case be seen by the high-pressure switch 90. Because of the setting of the fine calibration adjustment 38, the tool at the bottom of the tool holder 18 meets the workpiece positioned between the tool holder 18 and the anvil holder 12 when the piston 44 is x millimeters from the lower end of its travel in the cylinder 42. At this point, the down-limit switch 50 is actuated. Thus, with the gap between the bottom of the anvil holder 18 and the anvil holder 12 being too small for a finger to be inserted therebetween, the contacts 94 of the down-limit switch 50 are closed. Upon a further descent of the ram by one or two millimeters, the upper portion 64 of the tool holder 18 is forced inwardly into the locking device 36 against the weak action of the biassing springs 66, to close the contact switch 68. As a result, the contact pair 102 is also closed. This completes the connection between the electrical energising source 104 and the solenoid 106 of the dump valve 84. With the solenoid 106 thus energised, the dump valve 84 is closed, so that the low pressure switch 86 and the low pressure relief valve 88 can no longer see the pressure in the feed line 70. The only limitations to the pressure in that line are therefore now only those imposed by the high pressure switch 90 and the main system relief valve 108. The lower of these two limits is that set by the high pressure switch 90 at 2500 p.s.i. This is sufficient to clinch a rivet bush on to a piece of sheet metal with the illustrated ram. Once the clinching action has occured, or whatever other action the machine is performing, pressure above the piston 44 will exceed 2,500 p.s.i. either because of the resistance of the workpiece or because the piston 44 has bottomed within the cylinder 42. The high pressure switch will then operate the up solenoid 82 to effect fly-back of the ram.

It is very important, therefore, that safety precautions are taken to see that the high pressure forces would never be applied to a finger or hand of the operator.

Supposing, after depressing the foot pedal 110, an operator inadvertently has a finger between the anvil holder 12 and the punch holder 13 as the latter is descending under the action of the ram. When the punch meets the finger, the upper portion 64 of the punch holder 18 will be urged upwardly into the locking device 36 against the relatively weak force of the biassing springs 66 to close the contact switch 68. As a result the relay coil 100 closes the contact pairs 98 and 102. Since the contact pairs 94 of the down-limit switch 50 remain open, the gap between punch and anvil being in excess of x millimeters and therefore the start of the recessed part 62 of the cam 60 not yet having reached the ball 56, the dump valve 84 remains open and the pressure in the line 70 cannot rise above the pressure of the low-pressure relief valve 88. More importantly, since the contact pairs of the down-limit switch 50 remain closed, the piston 44 not yet having reached the last x millimeters of its travel, the electrical energising source 96 triggers the up solenoid 82 for an immediate withdrawal of the punch holder 18 as the piston 44 rises. To ensure this, the down solenoid 80 is de-energised whenever the up solenoid 82 is energised.

It will be understood that, in the event that the contact switch fails in an open state, the positioning of the finger of the punch and anvil will trigger the low pressure switch 26 at about 10 p.s.i. to operate the relay coil 100 in the same way as the contact switch 68. Should the low pressure switch fail as well, for example, if it were blown by a high surge of pressure, the low pressure relief valve 88 would come into operation, limiting the pressure in the feed line 70 to a value not much higher than 20 p.s.i., 20 p.s.i. being the lower end of the hysteresis of the low pressure relief valve 88. Although this would hurt a finger, it is unlikely to permanently damage it. Only if this low pressure relief valve fails closed in addition to failure of the low pressure 86 and the contact switch 86 can a damaging force be exerted on the operator's finger If a very thick workpiece has to be inserted between the punch and anvil, (or a longer punch holder is to be used) the relative starting positions (prior to a downstroke) between these two parts may be adjusted by raising (or subsequently lowering) the punch holder 18 in relation to the ram 34 by rotation of the calibrated adjustment 38 on the screw-threaded portion 48, without altering the setting of the cam 60 relative to the cylinder 42. A switch 120 shown in FIG. 1 enables the operator to switch the machine from an operating state to a setting state to effect this adjustment. When the switch 120 is positioned for setting the machine, the ram descends with a small force only. When the switch 120 is put back to its operating position, the ram 34 will not bottom within itself when the punch holder is a predetermined distance above the anvil. The system remains inherently safe, however. If the operator sets the machine for a thick workpiece and tries to use it on a thin workpiece, the ram will fly back at a stage before the punch has reached the workpiece. If the machine is set for a thin workpiece and a thicker one is actually inserted, the ram will fly-back as soon as the punch meets the workpiece.

The illustrated press is advantageous in that safety is maintained even through rapid descent of the ram is made possible by direct power feed of hydraulic fluid into the cylinder above the piston throughout the descent of the ram. Furthermore, because the full working force is never applied until the piston is about to bottom out within the cylinder, very precise pressing operations are made possible.

Thus it will be appreciated that the hydraulic system of the illustrated press is a two pressure system, having a solenoid operated valve in addition to the main directional valve which dumps pressure over a preset level, through a relief valve.

A limit switch detects when the punch is at a safe distance from the anvil and closes this dump valve so allowing full pump pressure to the head of the ram. The ram carries out its intended operation and then bottoms within itself. System pressure then builds to a preset level and a pressure switch actuates the main directional control valve and the ram returns.

The limit switch which detects the safe distance is only active during this distance, therefore full system pressure is available to the head of the ram only at this distance. In addition to the low/high pressure system, the head of the ram has a floating element containing an electrical contact. The element is biased downwards under light spring pressure.

If during the time that the ram is descending, the contact is closed by an obstruction larger than the safe distance, the ram is returned. The contact is connected to a relay coil, and it is a contact of this relay that returns the ram.

In order to ensure that the safety switch has not failed open, a contact of this relay is in line with the high pressure dump valve, such that should the switch fail open, high pressure cannot be initiated.

Further, a pressure switch is situated in the low pressure line, which is in parallel with the floating head contact. This limits to acceptable levels the amount of low pressure applied should the floating head contact fail open. If the floating head contact fails closed, the ram will not descend an initiation.

Many variations to the illustrated press will occur to the reader without taking it clear of the present invention. For example, the down-limit switch 50 has a spring loaded ball within a bore. This may be replaced by any other kind of limit switch, for example a simple contact pair one of which is fixed in relation to the cylinder and another of which is fixed in relation to the piston or piston rod.

I claim:

1. A press comprising:
   (a) a frame;
   (b) two press parts which are mounted on said frame in such a manner that one of the two parts is moveable towards the other part;
   (c) drive means mounted on said frame and connected to said one of the two parts to effect such movement;
   (d) a detector switch positioned on one of said two press parts, or a member connected thereto, and arranged to be operated by a resistance to such movement;
   (e) a limit switch connected to said drive means and arranged to be operated by means of the motion of said one of the two press parts, or a member connected thereto, when the remaining available travel of said one of the two press parts in a direction towards said other press part is less than the thickness of an operator's finger
   (f) control means connected to said drive means and having a first electrical input which, when an electrical signal is applied thereto, stops such movement, and a second electrical input which, when an electrical signal is applied thereto, enables a working force to be applied to said one of the two parts by the drive means;
   (g) a first switch means connected to said limit switch, which is normally in a conductive state but which is switched to a non-conductive state upon operation of said limit switch;
   (h) a second switch means connected to said limit switch, which is normally in a non-conductive state but which is switched to a conductive state upon operation of said limit switch;
   (i) a first switch means connnected to said detector switch, which is normally in a non-conductive state but which is switched to a conductive state upon operation of said detector switch; and
   (j) a second switch means connected to said detector switch, which is normally in a non-conductive state but which is switched to a conductive state upon operation of said detector switch;
   in which the respective said first switch means connected to said limit switch and said detector switch are connected in series with one another to said first input of said control means, and in which the respective said second switch means connected to said limit switch and said detector switch respectively are connected in series with one another to said second input of said control means;
   whereby said drive means acts on said one of the two press parts with a working force in said direction when both said limit switch and said detector switch have been operated, and movement of said one of the two press parts in said direction is stopped when said detector switch is operated, during a given approach of that press part towards said other press part, in the event that said limit switch has not yet been operated for that given approach, and such movement is also prevented in the event that said detector switch fails in its operated condition prior to operation of said limit switch.

2. A press according to claim 1, wherein said two press parts comprise a fixed anvil support mounted on said frame and a moveable punch carrier mounted on said frame so as to be moveable between two ends of travel towards and away from said fixed anvil support.

3. A press according to claim 1, in which said detector switch comprises a normally open open-to-close contact switch, and in which said first and said second switch means of said detector switch each comprise contact pairs which are closed by means of a relay which is energised upon operation of said contact switch.

4. A press according to claim 1, in which a first portion of the said one of the two press parts is adjustable, in relation to a second portion of the first-mentioned part, without changing the position of that second portion at which the limit switch is operated.

5. A press according to claim 4, in which the said first portion of the first-mentioned part is adjustable by means of a screwthread.

6. A press according to claim 1, in which the drive means comprises an hydraulic piston and cylinder arrangement, and in which a low pressure switch and a low pressure relief valve are connected to an hydraulic feed line of said hydraulic piston and cylinder arrangement.

7. A press according to claim 6, in which the low pressure switch and the low pressure relief valve are connected to the hydraulic feed line via a valve which is closed for high-pressure operation.

8. A press according to claim 6, in which the low pressure switch is connected so that, if it is operated, it will also prevent a working force being applied to the first-mentioned part.

9. A press comprising:
   (a) a frame;
   (b) two parts which are mounted on said frame in such a manner that one of the two parts is moveable towards the other part;
   (c) drive means mounted on said frame and connected to said one of the two parts to effect such movement;
   (d) a detector switch positioned on one of said two press parts, or a member connected thereto, and arranged to be operated by a resistance to such movement;
   (e) a limit switch connected to said drive means and arranged to be operated by means of the motion of said one of the two parts, or a member connected thereto, when the remaining available travel of said one of the two parts in a direction towards said other part is less than the thickness of an operator's finger, to enable said drive means to act on said one of the two parts with a working force in said direction, in which said detector switch is connected to control operation of said drive means to stop further movement of said one of the two parts in said direction when said detector switch is operated, during a given approach of that part towards said other part, in the event that said limit switch has not yet been operated for that given approach, and in which said detector switch is connected to enable said drive means to act on said one of the two parts with a working force in said direction when said detector switch is operated, during a given approach of that part towards said other part, in the event that said limit switch has been operated for that given approach, whereby such working force is applied in dependence upon operation of such said limit switch and, subsequently, said detector switch;

wherein said drive means comprises a fluid piston and cylinder arrangement, and wherein the press further comprises a low pressure switch connected to the fluid input of said fluid piston and cylinder arrangement and to inhibit application of such a working force upon the fluid pressure of said input exceeding a predetermined threshold value, and a valve positioned between said fluid input and said low pressure switch, which valve is connected to said limit switch and said detector switch to close the fluid passage between said low pressure switch and said fluid input in dependence upon operation of both said limit switch and, subsequently, said detector switch.

10. A press comprising:
(a) a frame;
(b) two parts which are mounted on said frame in such a manner that one of the two parts is moveable towards the other part;
(c) drive means mounted on said frame and connected to said one of the two parts to effect such movement;
(d) a detector switch positioned on one side of said two press parts, or a member connected thereto, and arranged to be operated by a resistance to such movement;
(e) a limit switch connected to said drive means and arranged to be operated by means of the motion of said one of the two parts, or a member connected thereto, when the remaining available travel of said one of the two parts in a direction towards said other part is less than the thickness of an operator's finger, to enable said drive means to act on said one of the two parts with a working force in said direction, in which said detector switch is connected to control operation of said drive means to stop further movement of said one of the two parts in said direction when said detector switch is operated, during a given approach of that part towards said other part, in the event that said limit switch has not yet been operated for that given approach, and in which said detector switch is connected to enble said drive means to act on said one of the two parts with a working force in said direction when said detector switch is operated, during a given approach of that part toward said other part, in the event that said limit switch has been operated for that given approach, whereby such working force is applied in dependence upon operation of both said limit switch and, subsequently, said detector switch;

wherein said drive means comprises a fluid piston and cylinder arrangement, and wherein the press further comprises a low pressure relief valve connected to the fluid input of said fluid piston and cylinder arrangement, so that fluid pressure at said fluid input cannot exceed a predetermined threshold value, and a valve positioned between said fluid input and said low pressure relief valve, which valve is connected to close the fluid passage between said low pressure relief valve and said fluid input in dependence upon operation of both said limit switch and subsequently, said detector switch.

* * * * *